June 6, 1950 R. H. EDELL ET AL 2,510,565
ABRADING APPARATUS
Filed Nov. 26, 1948 6 Sheets-Sheet 1
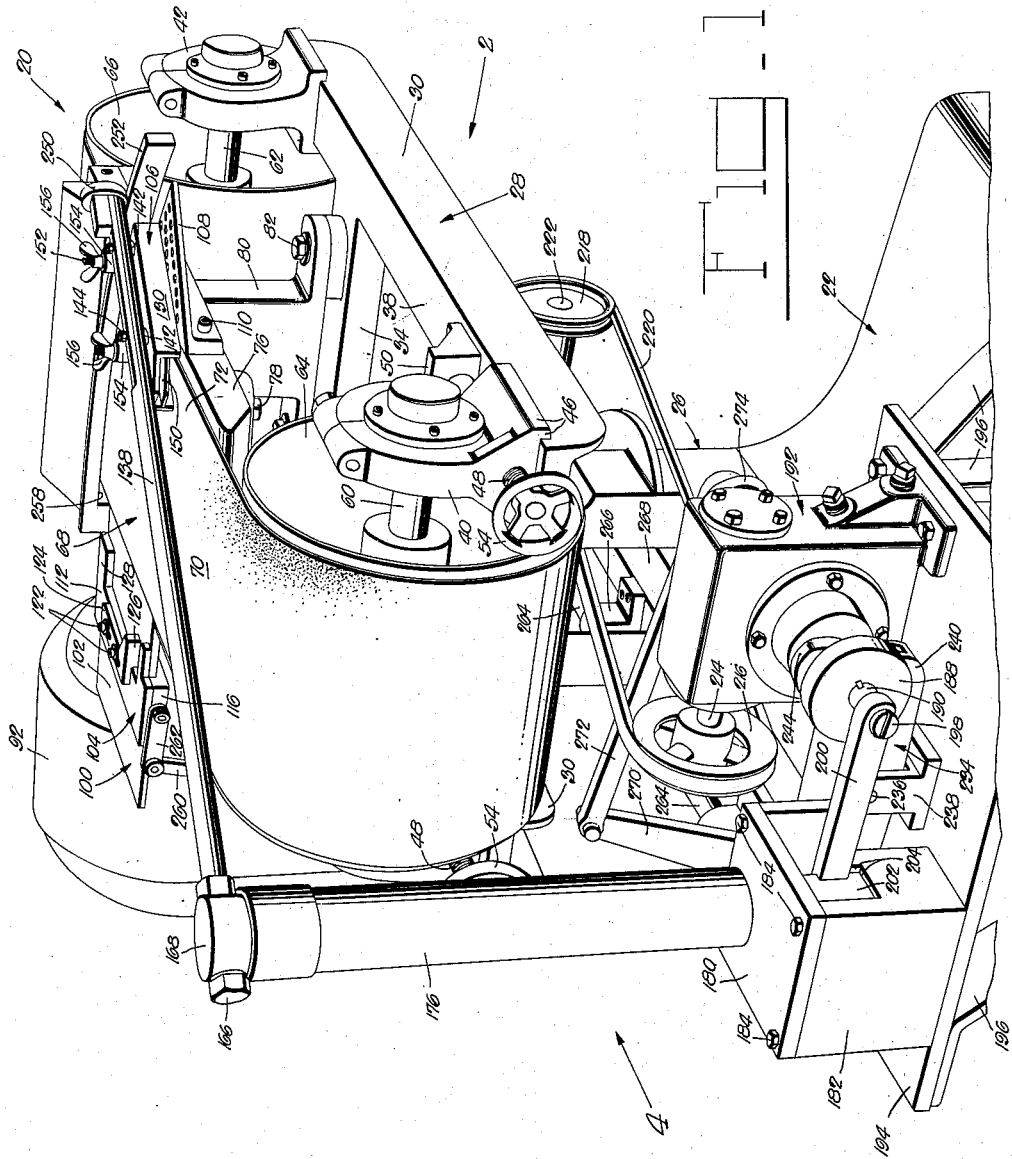
INVENTORS
RUSSELL H. EDELL & ROLLAND G. HALL
BY Edwin Levisohn
ATTORNEY.

June 6, 1950
R. H. EDELL ET AL
2,510,565
ABRADING APPARATUS
Filed Nov. 26, 1948
6 Sheets-Sheet 2
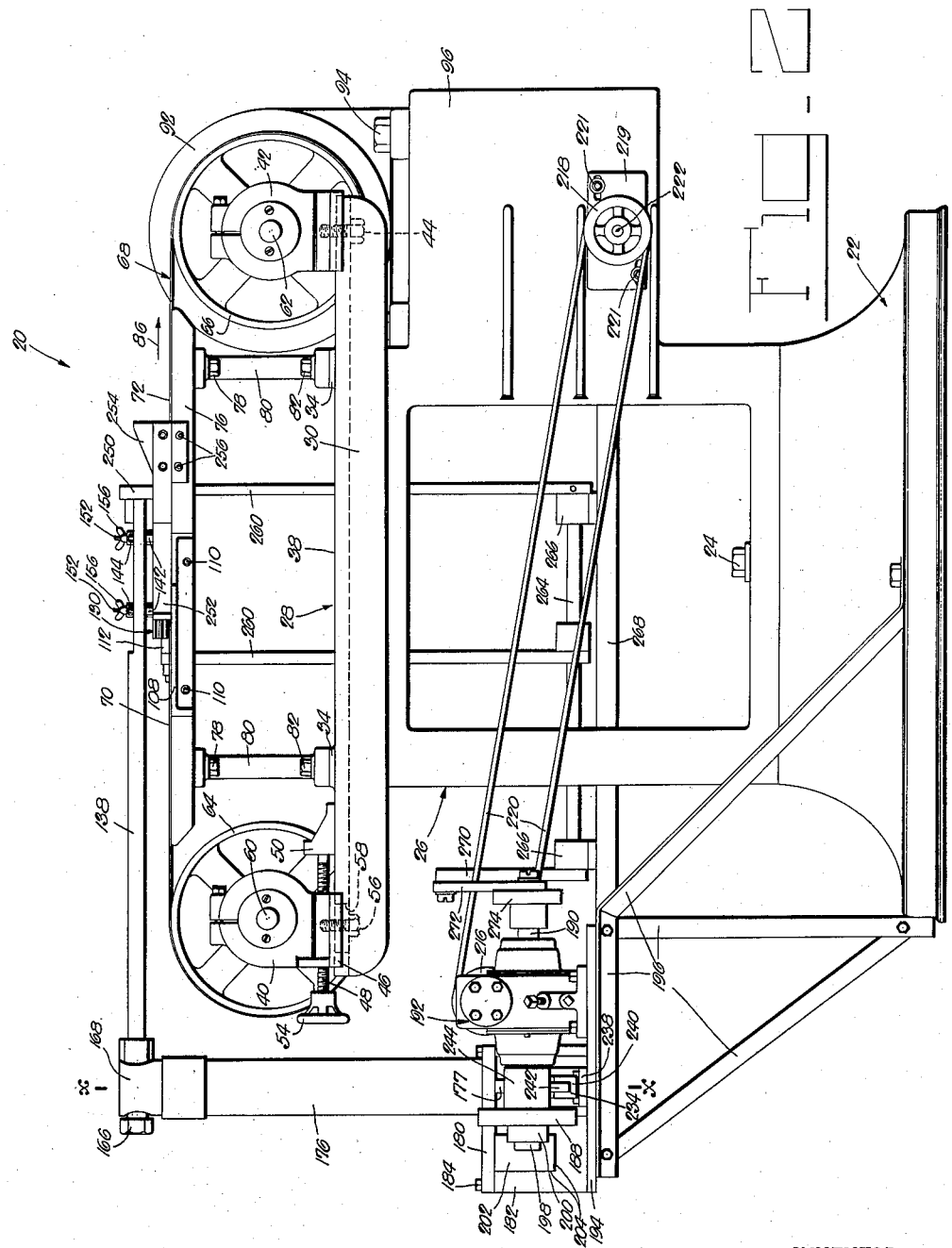
INVENTORS
RUSSELL H. EDELL & ROLLAND G. HALL
BY Edwin Levisohn
ATTORNEY.

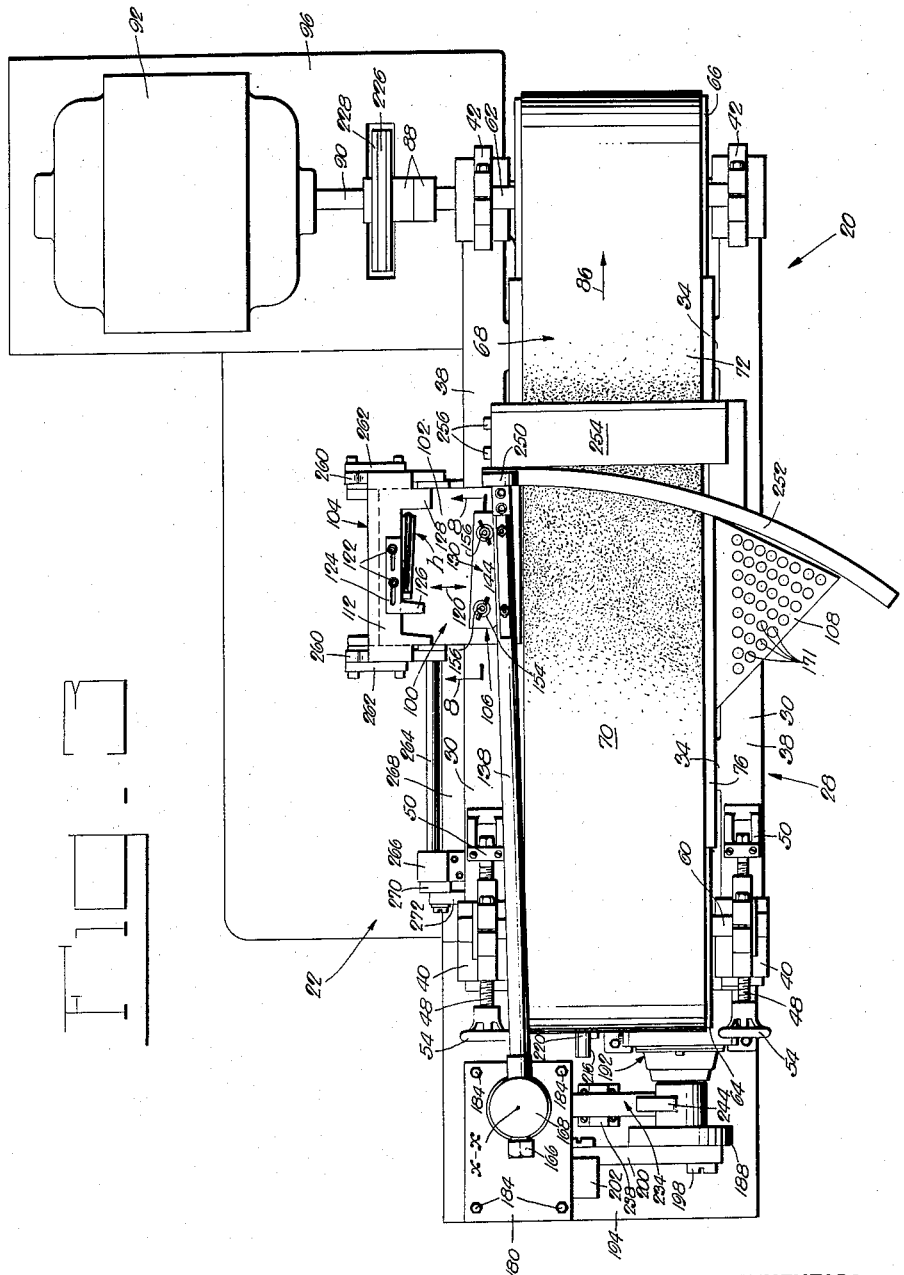

June 6, 1950  R. H. EDELL ET AL  2,510,565
ABRADING APPARATUS
Filed Nov. 26, 1948  6 Sheets-Sheet 4
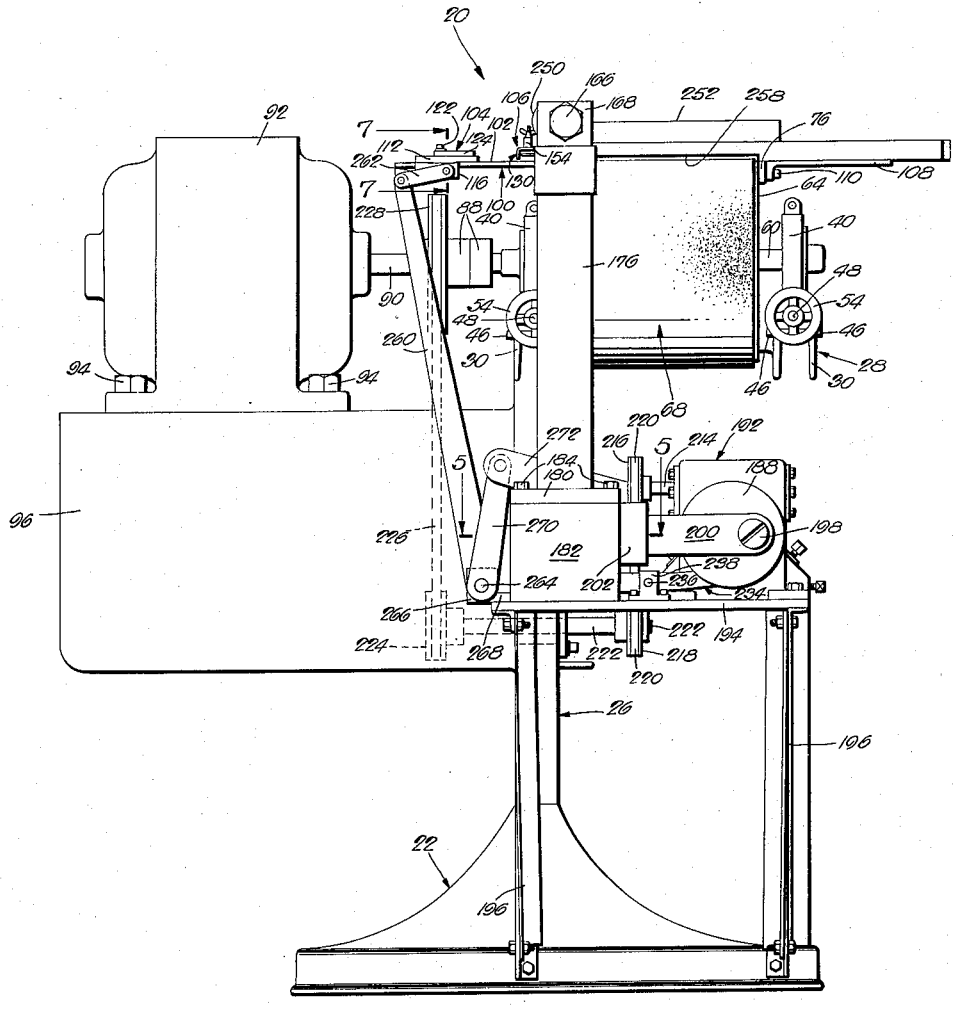
INVENTORS
RUSSELL H. EDELL & ROLLAND G. HALL
BY Edwin Lenoher
ATTORNEY.

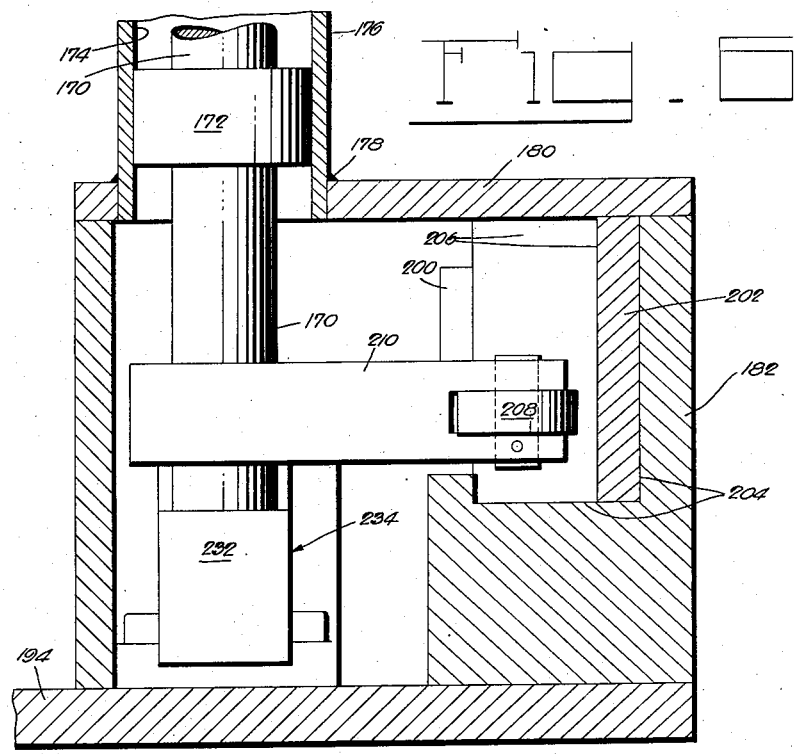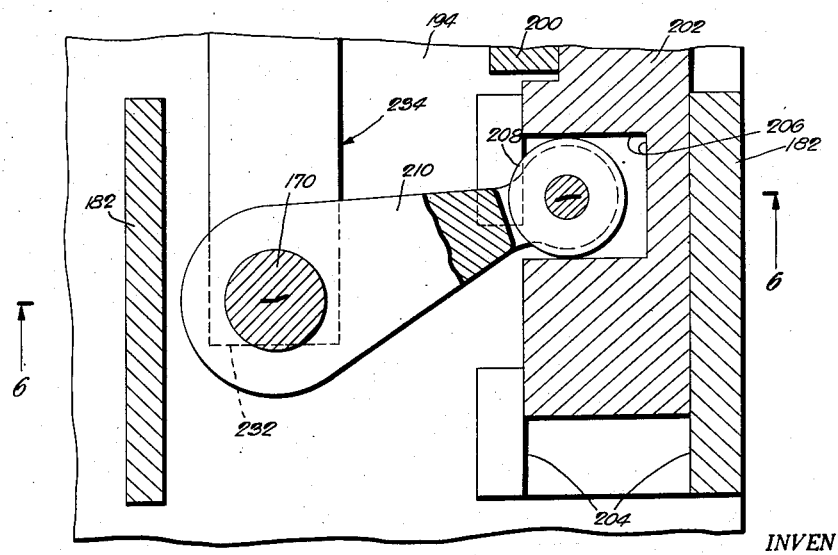

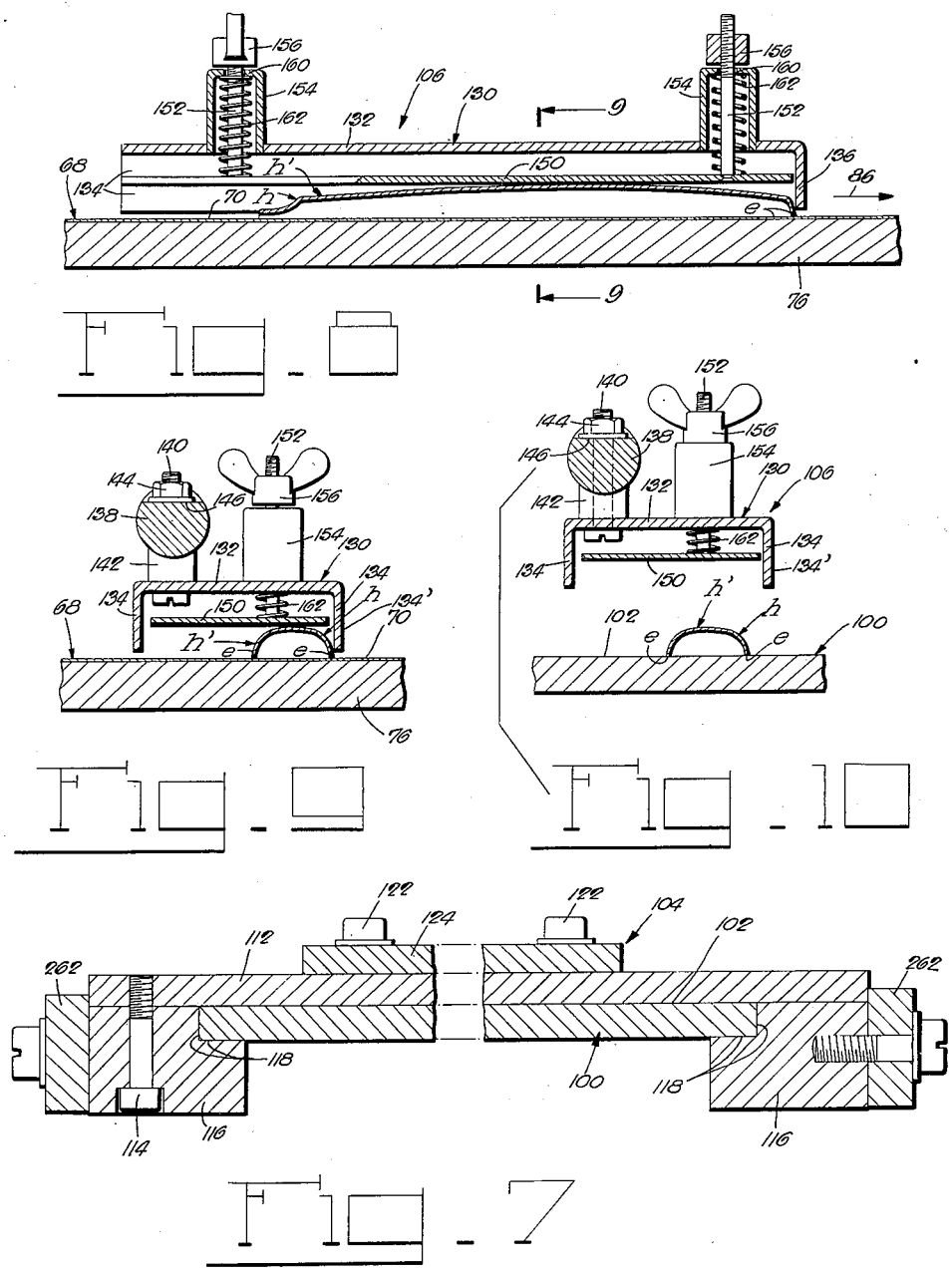

Patented June 6, 1950

2,510,565

UNITED STATES PATENT OFFICE 2,510,565

ABRADING APPARATUS

Russell H. Edell and Rolland G. Hall, Yalesville, Conn., assignors to R. Wallace & Sons Manufacturing Company, Wallingford, Conn., a corporation Application November 26, 1948, Serial No. 61,953

15 Claims. (Cl. 51—137)

This invention relates to abrading apparatus, and more especially to apparatus for abrading surfaces of complementary parts of table ware preparatory to their joinder by solder.

Handles for knives of the table variety, for instance, are customarily made of two embossed halves that are soldered together at their abutting edges. In order to obtain a strong joint between the soldered halves of a knife handle, their confronting edges are usually subjected to an abrading operation prior to their joinder by solder. The abrading operation will not only level these edges for their subsequent uniform engagement, but will also roughen them to the extent where the subsequently applied solder will become firmly bonded thereto.

It is the primary aim and object of the present invention to provide apparatus for efficiently and accurately abrading the edges to be soldered of the halves of knife handles of the above type, for instance, without requiring the services of an operator other than feeding the handle halves into the apparatus in a manner requiring no skill whatever.

The above and other objects, features and advantages of the present invention will be more fully understood from the following description considered in connection with the accompanying drawings.

In the drawings:

Fig. 1 is a perspective view of abrading apparatus embodying the present invention;

Fig. 2 is a side elevation of the apparatus as viewed in the direction of the arrow 2 in Fig. 1;

Fig. 3 is a top plan view of the apparatus;

Fig. 4 is a front elevation of the apparatus as viewed in the direction of the arrow 4 in Fig. 1;

Fig. 5 is an enlarged fragmentary section, taken on the line 5—5 of Fig. 4;

Fig. 6 is a fragmentary section taken substantially on the line 6—6 of Fig. 5;

Fig. 7 is an enlarged section taken substantially on the line 7—7 of Fig. 4;

Fig. 8 is an enlarged fragmentary section taken on the line 8—8 of Fig. 3;

Fig. 9 is a section taken on the line 9—9 of Fig. 8; and

Fig. 10 is a section similar to Fig. 9, but showing the parts in a different position of operation.

Referring to the drawings, and more particularly to Figs. 1 to 3 thereof, the instant apparatus 20 comprises a base 22 on which is suitably mounted, as at 24, an upright frame 26 having a bed plate 28 which, in the present instance, consists of spaced parallel side rails 30 and connecting transverse rails 34. The base 22, as well as the upright frame 26 with the bed plate 28, are preferably castings. The side rails 30 of the bed plate 28 may be of channel-shaped cross section with the webs 38 thereof serving as supports for any suitable front and rear bearing brackets 40 and 42, respectively. The bearing brackets 42 in the rear of the apparatus may fixedly be mounted on the side rails 30, respectively, by bolts 44 that extend through the webs 38 of the side rails and are threadedly received by the respective bearing brackets 42 (Fig. 2). The bearing brackets 40 in front of the apparatus are provided with preferably integral, depending lugs 46, respectively, which straddle the side rails 30, respectively, and thus guide the bearing brackets 40 for movement longitudinally of their respective side rails 30 (see also Fig. 4). The bearing brackets 40 are, for a purpose hereinafter described, adjustable longitudinally of their respective side rails 30 by means of spindles 48, respectively, which are threadedly received by the respective bearing brackets 40 and axially immovably journalled in blocks 50, suitably mounted at 52 on the side rails 30, respectively. The front end of each spindle 48 preferably carries a hand wheel 54 for readily turning the spindle for an adjustment of the corresponding bearing bracket 40. Each bearing bracket 40 may be locked in its adjusted position by a bolt 56 (Fig. 2) that projects through an elongated slot 58 in the adjacent side rail 30 and is threadedly received by the bearing bracket. Journalled in the front and rear bearing brackets 40 and 42 are shafts 60 and 62, respectively, on which are suitably mounted drums 64 and 66, respectively, over which passes any suitable abrasive belt 68, having its abrasive face 70 turned outwardly. The front bearing brackets 40 may be adjusted to take up slack in the abrasive belt 68, as will be readily understood. The top run 72 of the abrasive belt 68 is supported on a table 76 that may suitably be mounted at 78 on spaced pedestals 80 which are, in turn, suitably mounted at 82 on the transverse rails 34, respectively, of the bed plate 28 of the apparatus.

For driving the abrasive belt 68 in the direction of the arrow 86 in Figs. 2, 3 and 8, the shaft 62 of the rear drum 66 may suitably be coupled at 88 to the shaft 90 of an electric motor 92, which is suitably mounted at 94 on a lateral extension 96 of the upright frame 26. The abrasive belt 68 is thus driven at the same speed as the motor 92.

Mounted in any suitable manner on the table 76 is a laterally extending "loading" platform 100, the top surface 102 of which is preferably flush with the abrasive face 70 of the belt 68. Slidable on the loading platform 100 is a transfer device 104 which is adapted to advance or transfer a half $h$ of a knife handle, for instance, on the platform 100 from the "loading" position shown in Fig. 3 to a "transfer" position underneath a feeding device 106 in its retracted position (Figs. 3 and 10). The feeding device 106 is adapted, as more fully described hereinafter, to move a handle half $h$ from its transfer position across the continuously traveling abrasive belt 68 and over and beyond a plate 108 which is suitably secured at 110 to the platform 76 (Figs. 1 to 3).

The transfer device 104 comprises a slide 112, to the opposite ends of which are secured, as by screws 114, gibs 116, respectively, which form, together with the slide 112, a guideway 118 in which the loading platform 100 is received (see also Fig. 7). The slide 112 is thus guided on the loading platform 100 for reciprocatory movement in the direction of the arrow 120 in Fig. 3.

The handle halves $h$ to be operated on in the apparatus are, in the present instance, embossed blanks of precious or non-precious sheet metal (Figs. 3 and 8 to 10), which are successively placed into the described loading position with their edges $e$ resting on the top face 102 of the loading platform 100. In order to facilitate the operator's task of placing successive handle halves of varying length into the correct loading position on the platform 100, the slide 112 has adjustably secured thereto, as at 122, a bar 124 (Fig. 3) which is provided with a laterally projecting finger 126 that cooperates with a lateral lug 128 on the slide 112 in defining a longitudinal space on the platform 100 in which to place successive handle halves $h$. The slide 112 is reciprocated in a manner described hereinafter.

The feeding device 106 comprises a channel-shaped feed member 130 (Figs. 8 to 10) having a top wall 132, opposite side walls 134 and an end wall 136. The feed member 130 is mounted in depending fashion on an arm 138 by means of bolts 140 which extend through spacers 142 between the member 132 and the arm 138 and receive nuts 144 that are tightened against a flat surface 146 on the arm 138 (Figs. 3 and 9). There is also provided a pressure plate 150, having spaced studs 152 (Fig. 8) that extend through hollow bosses 154, respectively, on the feed member 130 and receive wing nuts 156 therebeyond. Surrounding each stud 152, and interposed between the pressure plate 150 and the bottom wall 160 of the respective boss 154 on the feed member 130, is a compression spring 162. The arm 138, which carries the feed member 130, is swingable about, and also movable in the direction of, an axis $x$—$x$ (Figs. 2 and 3) in a manner to be described presently.

The arm 138 is suitably carried at 166 on the head 168 of a rod 170 (Fig. 6) which is provided with spaced collars 172 that are slidable on the inner, machined wall 174 of a cylindrical post 176, suitably mounted at 178 on a base plate 180 which is, in turn, mounted on a bracket 182 as by screws 184, for instance. Thus, the arm 138 is swingable about the described axis $x$—$x$ which is coextensive with that of the rod 170. The arm 138 is swung in opposite directions by means of a crank disk 188 on the driven, low-speed shaft 190 of any suitable reduction gearing 192 (Figs. 1, 2 and 4) which, like the bracket 182, is mounted on a table 194 that is, in turn, mounted on any suitable framework 196 on the base 22 of the apparatus. The crank disk 188 is provided with an eccentric pin 198 which is connected through a link 200 with a block 202, slidable in a horizontal guideway 204 in the bracket 182 (Figs. 1, 5 and 6). The block 202 is provided with a vertical groove 206 into which projects an anti-friction roller 208 on one end of a rocker 210 which is firmly mounted with its other end on the rod 170 (Fig. 5). Thus, the arm 138 is oscillated once on each revolution of the crank disk 188, as will be readily understood. The high-speed shaft 214 of the reduction gearing 192 carries a pulley 216 which is drivingly connected with another pulley 218 underneath the bed plate 28 by means of a belt 220. The pulley 218 is carried by one end of a shaft 222, the other end of which carries another pulley 224 (Fig. 4) that is drivingly connected by a belt 226 with another pulley 228 on the shaft 90 of the motor 92. The shaft 222 is journalled in a bearing bracket 219 (Fig. 2) which is adjustably mounted at 221 on the frame extension 96 to permit the take-up of slack in the belt 220.

The arm 138 is, as previously mentioned, also movable in the direction of the axis $x$—$x$. To this end, the rod 170 rests against one end 232 of a lever 234 (Figs. 5 and 6) which is pivotally mounted at 236 in a bracket 238 on the table 194 (Figs. 1 and 4). The other end 240 of the lever 234 preferably carriese an anti-friction roller 242 which cooperates with a cam disk 244 on the low-speed shaft 190 of the reduction gearing 192. The above-described driving connection between the rocker 210 and the block 202 (Figs. 5 and 6) does not interfere with the referred movement of the arm 138 in the direction of the axis $x$—$x$, since the anti-friction roller 208 remains within the confines of the groove 206 throughout the range of such movement of the arm 138.

Suitably carried at the free end of the arm 138 is a roller 250 (Figs. 1 to 3) which, in the lower position of the feed member 130 (Fig. 9), rides on a rail 252 which is arcuate about the swing axis $x$—$x$ of the arm 138. The rail 252 is suitably carried by a bracket 254 which is clamped or otherwise secured to the table 76 as at 256 (Figs. 2 and 3). The rail 252 and the bracket 254 are recessed at 258 to clear the abrasive belt 68 (Figs. 1 and 4).

The feeding device 104 is reciprocated on the loading platform 100 by spaced arms 260 (Figs. 2, 3 and 4), which are connected by links 262, respectively, with the adjacent gibs 116 on the slide 112. The arms 260 are mounted on a shaft 264 which is journalled in suitable bearing brackets 266 on an additional side rail 268 of the upright frame 26 (Figs. 1, 2 and 4). One end of the shaft 264 carries an arm 270 which is connected by a link 272 with another crank disk 274 on the low-speed shaft 190 of the reduction gearing 192. Thus, the slide 112 of the transfer device 104 is reciprocated once during each revolution of the crank disk 274.

Following is a description of a single cycle of operation of the instant apparatus. Assuming that the motor 92 is running and that the transfer device 104 and feeding device 106 assume the momentary positions shown in Fig. 3, the operator will then place a handle half $h$ into the "loading" position on the transfer platform 100, while the arm 138 will, by its own gravity and that of the rod 170, and under the control of the cam disk 244, be permitted to descend to its lower position (Fig. 9) in which the feed member 130 is in operative relation with a handle half $h'$ previously advanced to the "transfer" position (Fig. 10) by the device 104. It will be noted from Fig. 10 that the side wall 134' of the feed member 130 will, on descent of the latter into its lower position, be in close proximity to the transferred handle half h' so that the latter will, on the following outward swing of the arm 138, be immediately moved across the abrasive belt 68 and the plate 108. Also, the pressure plate 150 will, on the described descent of the feed member 130 to its lower position, engage the transferred handle half h' and exert a pressure thereon, as is evidenced by the slight rise of the wing nuts 156 above the respective bosses 154 on the feed member 130 (Fig. 9). The pressure exerted by the plate 150 on the handle half h' during its traverse of the abrasive belt 68 and plate 108, not only insures uniform engagement of the edge e of the handle half with the abrasive face 70 of the belt 68, but also determines the amount of abrasion, as well as the roughness, of said edge e. Preferably, the springs 162 of the pressure plate 150 are so calibrated as to exert on the handle half h' a pressure which is just sufficient to assure levelling, and only slight roughening, of the edge e thereof. Immediately after the feed member 130 descends into feeding relation with the transferred handle half h', the arm 138 and feed member 130 are, by the action of the crank disk 188, swung outwardly, moving thereby the handle half h' across the belt 68 with its edge e in forced contact with the abrasive face 70 of the latter. On leaving the abrasive belt 68, the handle half h' is moved over the plate 108, which is provided with a multiplicity of perforations 171 through which may escape into any suitable container therebeneath abraded matter, as well as abrasive matter, which is brushed by the handle half h' onto the plate 108. The outward swing of the arm 138 is such as to move the feed member 130 well beyond the plate 108 in order to permit the handle half h' to gravitate into another receptacle (not shown), in which the abraded handle halves may be collected.

Immediately after the arm 138 starts to swing outwardly, as described, the transfer device 104 is, by the action of the crank disk 274, advanced from the position shown in Fig. 3, advancing thereby the previously placed handle half h from "loading" position to "transfer" position for its subsequent pick-up by the feed member 130. Immediately on the described transfer of the handle half h, the transfer device 104 is retracted into the position shown in Fig. 3 to enable the operator to place another handle half h into the "loading" position on the platform 100 for its subsequent transfer by the device 104 into operative relation with the feed member 130. On arrival of the arm 138 and feed member 130 in their outermost position, they are raised into the position shown in Fig. 10 by the action of the cam disk 244. Thereupon, and substantially at the time of the described retraction of the transfer device 104, the arm 138 and feed member 130 will, by the action of the crank disk 188, be swung inwardly into the position shown in Fig. 3, ready for descent into operative relation with handle half last transferred. This concludes a single operating cycle of the apparatus.

The above-described operating cycle of the apparatus is, of course, repeated over and over as long as the motor 92 is running. Thus, the instant apparatus is automatic in its operation to the extent where an operator need merely place a handle half into the referred loading position on the platform 100 every time the transfer device 104 reaches its retracted position.

While in the preceding description reference was made to the halves of knife handles as being abraded in the instant apparatus, it is to be understood that other articles may be abraded in the instant apparatus with equal advantage.

While I have shown and described the preferred embodiment of my invention, it will be understood that various changes may be made in the present invention without departing from the underlying idea or principles of the invention within the scope of the appended claims.

Having thus described our invention, what we claim and desire to secure by Letters Patent, is:

1. Apparatus for abrading articles, comprising a substantially horizontal abrasive surface, means for imparting continuous motion to said surface in its own plane, a platform at one side of, and level and continuous with, said surface, a device slidably reciprocable on said platform and operative on each work stroke thereof to advance an article on said platform from a deposit station to a transfer station thereon, and mechanism operated in timed relation with said device for feeding each advanced article from said transfer station across said abrasive surface transversely of the path of motion thereof in forced engagement with the latter to a discharge station at the opposite side of said surface, said mechanism including a member in which the article is releasably positioned during the advance of said article from said transfer station to said discharge station and which has an open bottom so that the article is discharged by gravity when clear of said surface at said discharge station.

2. Apparatus for abrading articles, comprising two spaced rotary drums, an endless abrasive belt passed over said drums with its top run extending in a substantially horizontal plane and its abrasive face turned outwardly, means for driving one of said drums, a platform at one side of, and level and continuous with, said top run, a table underneath said top run on which the latter lies and travels, a device slidably reciprocable on top of said platform and operative on each work stroke thereof to advance an article on said platform from a deposit station to a transfer station thereon, and mechanism operated in timed relation with said device for feeding each advanced article from said transfer station in an arcuate path across said top run transversely of the path of motion thereof in forced engagement with the abrasive face thereof to a discharge station at the other side of said belt, said mechanism including a member in which the article is releasably positioned during the advance of said article from said transfer station to said discharge station and which has an open bottom so that the article is discharged by gravity when clear of said surface at said discharge station.

3. Apparatus for abrading articles, comprising an endless abrasive belt having a substantially horizontal top run and having its abrasive face turned outwardly, means for driving said belt, a flat support underneath said top run on which the latter lies and travels, a platform at one side of, and level and continuous with, said top run, a feed member movable above and transversely of said top run between a transfer station on said platform and an ejecting station beyond the other side of said top run, said member being also shiftable at said transfer station from a retracted position into an operative position in which it is in feeding relation with an article at said transfer station, operating means for moving said member between said stations and shifting it so as to feed an article from said transfer station across and in engagement with said top run to said ejecting station, on each movement of said member away from said transfer station, and a device operated in timed relation with said member for advancing an article on said platform from a deposit station thereon to said transfer station on each movement of said member away from said transfer station.

4. Apparatus as set forth in claim 3, in which said member is of inverted dish-shape and is shiftable between raised and lowered positions in which it clears an article, and partially covers the same, respectively, and said member clears said top run when in its lowered position.

5. Apparatus as set forth in claim 3, in which said member is of inverted dish-shape and shiftable between raised and lowered positions in which it clears an article, and partially covers the same, respectively, and said member clears said top run when in its lowered position and yieldingly carries an internal pressure plate pressing each article being fed against the abrasive face of said top run.

6. Apparatus as set forth in claim 3, further comprising an arm mounted at one end for swinging movement about a substantially vertical axis and also for movement in the direction of said axis, and carrying said feed member at its other end in depending fashion, and said operating means swing said arm back and forth between said stations and also axially move the same to shift said member.

7. Apparatus as set forth in claim 3, in which said device is a slide reciprocable on top of said platform and pushing an article from said deposit station to said transfer station on each work stroke thereof.

8. Apparatus for abrading plane surfaces of elongated articles, comprising an endless abrasive belt having a substantially horizontal top run and having its abrasive face turned outwardly, means for driving said belt, a platform at one side of, and level and continuous with, said top run, an inverted elongated channel member laterally movable above and across said top run between a transfer station on said platform and an ejecting station beyond the other side of said top run, said channel member being also shiftable at said transfer station from a raised position into a lowered position in which it straddles an article with its plane surface resting on said platform at said transfer station, said channel member clearing said top run when in its lowered position, operating means for moving said channel member between said stations and shifting it so as to feed an article from said transfer station across said top run to said ejecting station on each movement of said channel member away from said transfer station, said channel member having an end wall preventing an article therein from being carried away by the moving belt, and a device operated in timed relation with said channel member for advancing an article on said platform from a deposit station thereon to said transfer station on each movement of said channel member away from said transfer station.

9. Apparatus as set forth in claim 8, further comprising an arm mounted at one end for swinging movement about an axis at right angles to the plane of said top run, and also for movement in the direction of said axis, and carrying said channel member at its other end in depending fashion, a rail above said top run extending in an arc about said axis as a center, a roller on said other arm end riding on said rail in the lowered position of said arm, and said operating means swinging said arm back and forth between said stations and also axially moving the same to shift said channel member.

10. Apparatus as set forth in claim 8, in which said device is a U-shaped slide reciprocable on top of said platform, said slide having a yoke and spaced legs of which one leg is adjustable on said yoke to define a variable longitudinal space within which to place an article lengthwise on said platform, and said slide pushing a placed article from said deposit station to said transfer station on each work stroke thereof.

11. Apparatus for abrading articles, comprising an endless abrasive belt having a substantially horizontal top run and having its abrasive face turned outwardly, means for driving said belt, a flat support underneath said top run on which the latter lies and travels, a platform at one side of, and level and continuous with, said top run, a post having an internal cylindrical surface with its axis extending at right angles to said flat support, a shaft turnable and axially slidable in said post, an arm laterally projecting from said shaft above said top run and movable with said shaft, a feed member carried by the free end of said arm in depending fashion and swingable about said axis across said top run between a certain station on said platform and an ejecting station beyond the other side of said top run, said member being also shiftable at said certain station in the direction of said axis from a raised position into a lowered position in which it is in feeding relation with an article at said certain station, and operating means for oscillating said shaft to swing said member between said stations, and also axially moving said shaft to shift said member so as to feed an article from said certain station across and in engagement with said top run to said ejecting station on each swing of said member away from said certain station.

12. Apparatus as set forth in claim 11, in which said operating means comprise a rocker on said shaft having a follower at its free end, a slide guided for movement at right angles to said shaft and having a groove extending parallel to said shaft and receiving said follower, power means for reciprocating said slide, and means operated in timed relation with the slide reciprocation for moving said shaft axially, the axial movement of said shaft being shorter than the length of said groove so that said follower remains in the latter in any axial position of said shaft.

13. Apparatus as set forth in claim 11, further comprising a device operated in timed relation with said operating means for advancing an article on said platform from a deposit station to said certain station thereon on each swing of said member away from said certain station.

14. Apparatus for abrading articles, comprising a substantially horizontal abrading surface having opposite side edges, means for imparting continuous motion to said surface in its own plane, mechanism including a member operative in continuous cycles for feeding, in each cycle, an article from a certain station at one of said edges of said surface transversely of the path of motion of said abrasive surface in forced engagement with the latter and to a discharge position clear of the opposite edge of said surface, where the article is ejected from said member, and means for operating said mechanism to move said member in continuous cycles to and from said station and to and from said discharge position.

15. Apparatus for abrading articles, comprising an endless abrasive belt having a substantially horizontal top run and having its abrasive face turned outwardly, means for driving said belt, a platform at one side of said top run, a feed member movable above and transversely of the path of motion of said top run between a certain station on said platform and an ejecting station beyond the other side of said top run, said member being also shiftable at said certain station from a retracted position into an operative position in which it is in feeding relation with an article at said certain station, and means for operating said member in continuous cycles during each of which said member is moved transversely of said top run of the belt back and forth once between said stations and is shifted so as to feed an article from said certain station across and in engagement with said top run to said ejecting station.

RUSSELL H. EDELL.
ROLLAND G. HALL.

REFERENCES CITED

The following references are of record in the file of this patent:

UNITED STATES PATENTS

| Number | Name | Date |
|---|---|---|
| 282,293 | Fenn | July 31, 1883 |
| 763,743 | Ensign | June 28, 1904 |
| 2,057,290 | Bradbury | Oct. 13, 1936 |
| 2,288,944 | Fuller | July 7, 1942 |
| 2,359,488 | Ponder | Oct. 3, 1944 |